BENJAMIN F. KNOTT
CHARLES W. SUGGS
INVENTORS

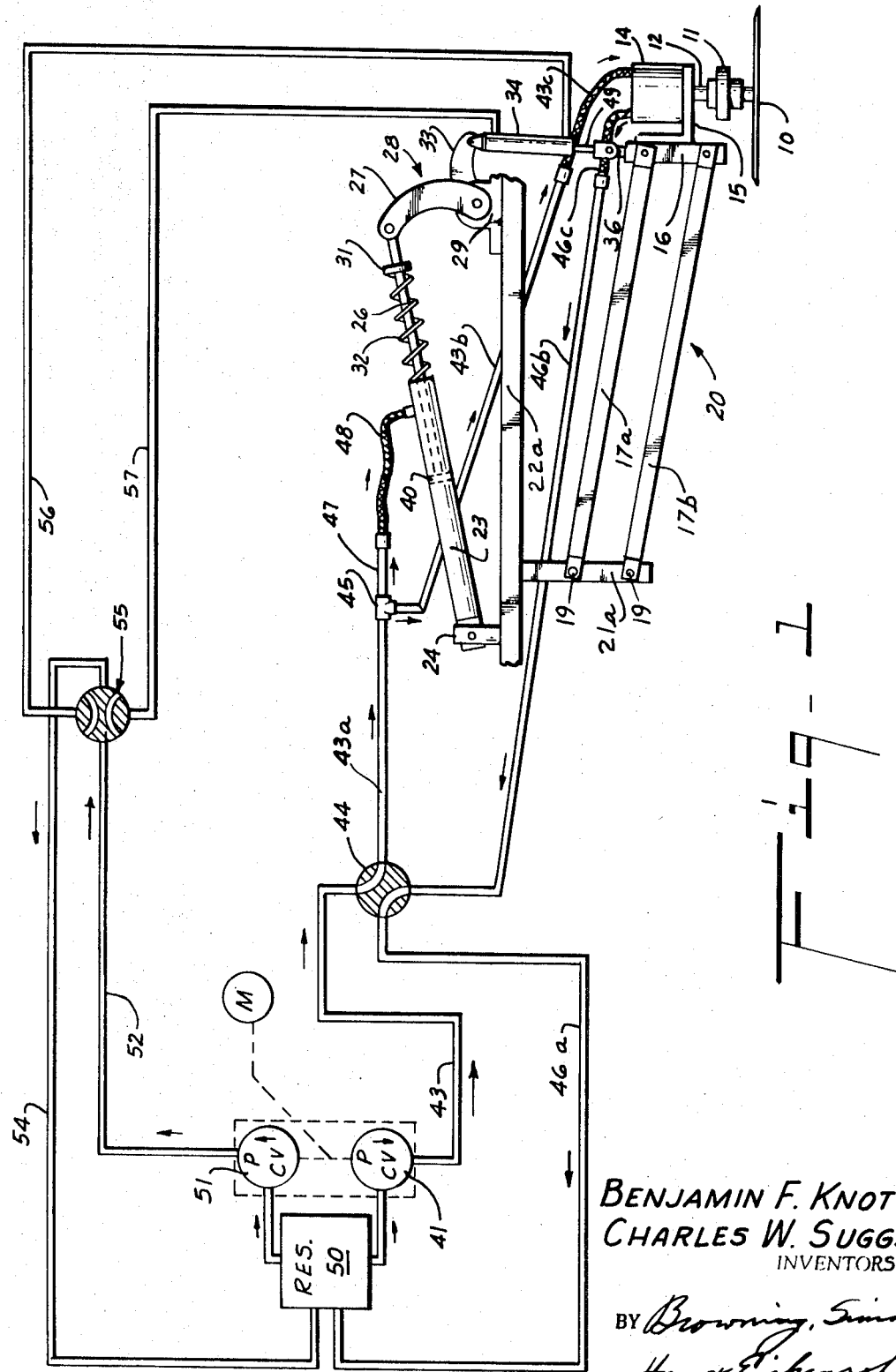

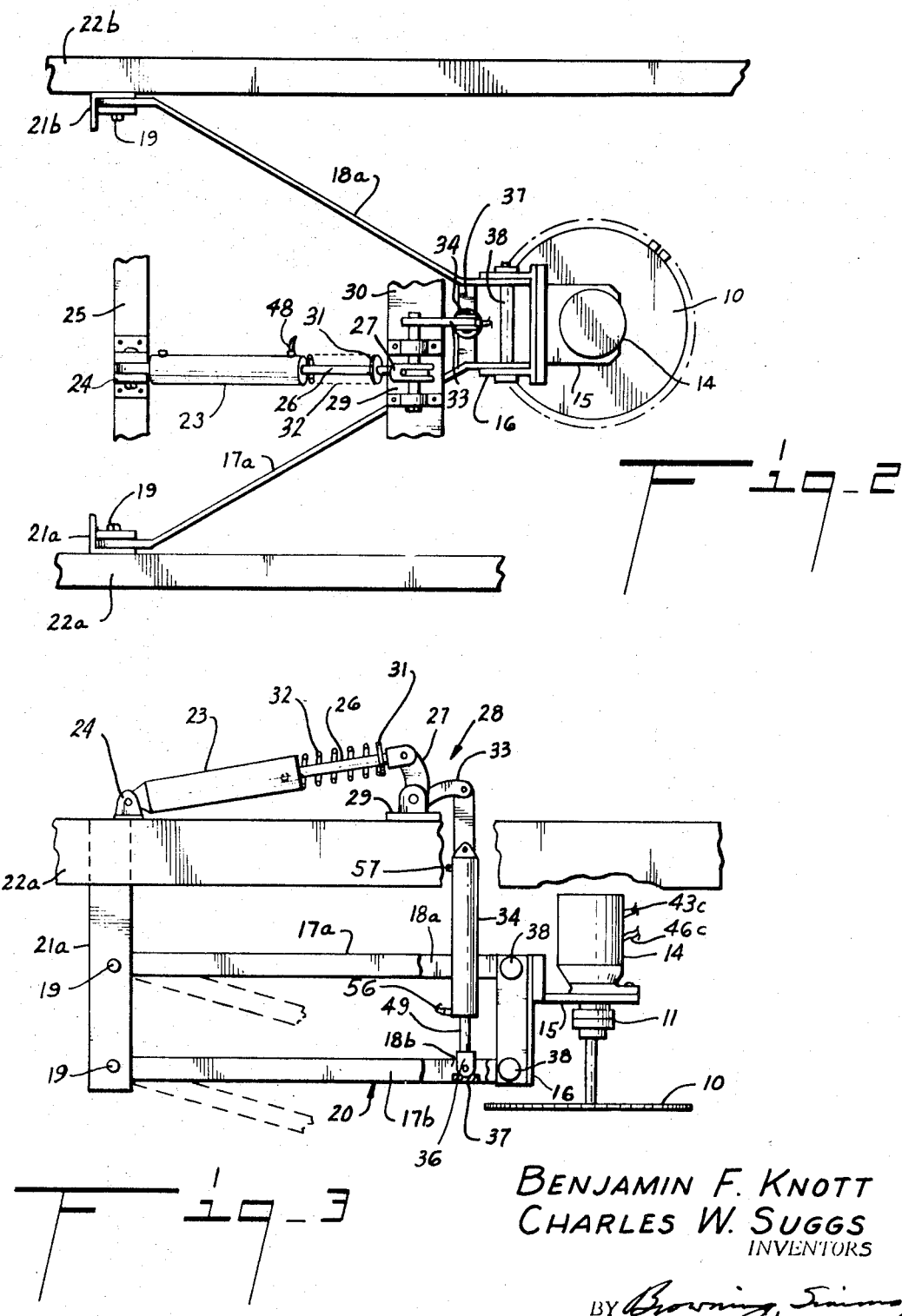

ATTORNEYS

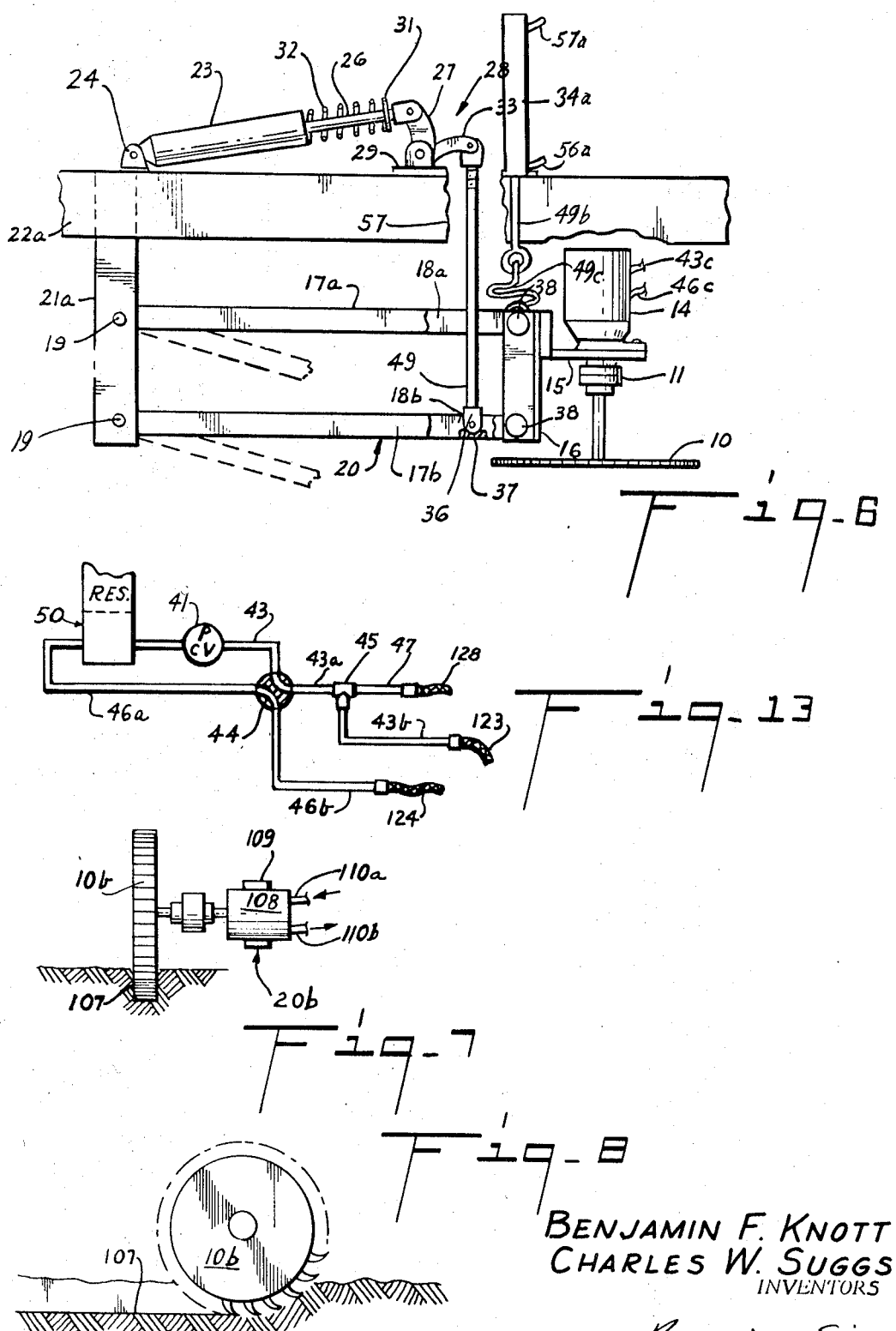

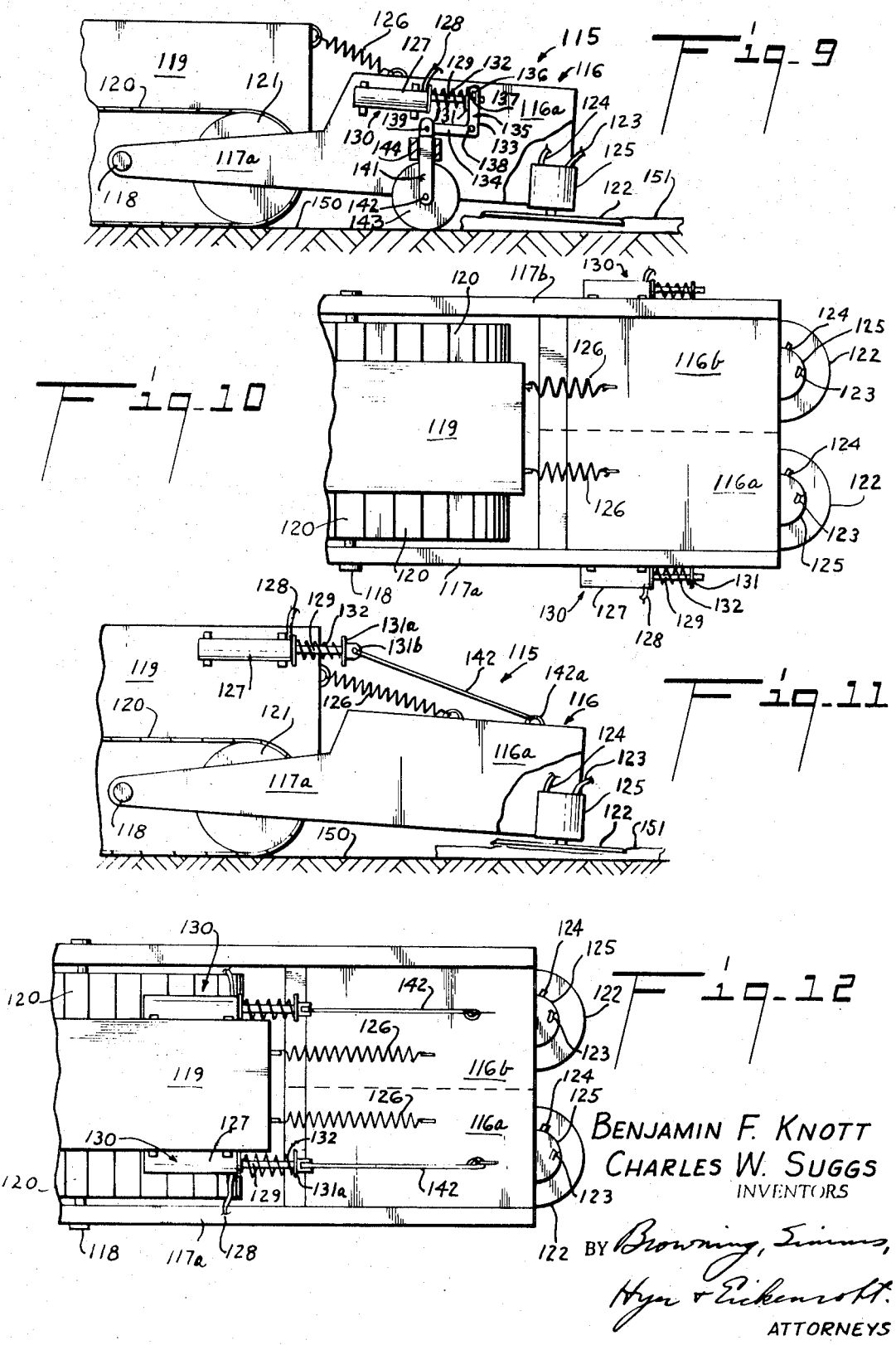

United States Patent Office 3,548,570
Patented Dec. 22, 1970

3,548,570
CUTTER BLADE CONTINUOUSLY AUTOMATICALLY ADJUSTABLE RESPONSIVE TO CHANGE IN RESISTANCE TO ITS OPERATION
Benjamin F. Knott, Henderson, and Charles W. Suggs, Raleigh, N.C., assignors, by mesne assignments, to The Thomson International Company, Thibodaux, La., a corporation of Delaware
Continuation-in-part of application Ser. No. 619,489, Jan. 23, 1967. This application Sept. 11, 1967, Ser. No. 666,755
Int. Cl. A01d 45/10; B23q 5/54
U.S. Cl. 56—15
11 Claims

ABSTRACT OF THE DISCLOSURE

A cutter blade assembly whose cutting height is variable in response to change in resistance to its operation in which a power operated blade is mounted on a retractable and extensible support which in turn is attached by means of a connecting linkage to a main carrier member. The assembly has a sensor connected to the power transmitting means for determining variations in the power transmitted to the cutter blade which in turn is indicative of changes in resistance to the operation of the blade. A power means is connected to the sensor and to the connecting linkage which serves to urge the connecting linkage and hence the support towards a retracted position with a force proportional to the resistance to operation of the cutter blade. The connecting linkage has a spring-type bias which serves to bias the linkage and ultimately the cutter blade towards a lowered or extended position.

---

This application is a continuation-in-part of our prior co-pending application filed Jan. 23, 1967, Ser. No. 619,489, now abandoned, for Cutter Blade Continuously Automatically Adjustable Responsive to Torque Change.

This invention relates generally to and has for its general object a means for automatically adjusting the position of a power actuated cutter blade, variously refererd to herein also as a cutter and as a blade, to maintain its cutting position substantially constant relative to the surface of an object at or near which surface a cut is being made, despite variations in such surface relative to a carrier on which the blade is carried.

In cutting sugar cane, for example, it is highly desirable that the cane be cut near or slightly below the ground surface, just where the butts emerge from the ground, so as to harvest the last few inches above the ground, because this last few inches has been found to have a sugar content somewhat greater in proportion to its length than the remainder of the cane stalk. Attempts to accomplish this in the past have not met with practical success for various reasons, one being that previously tried means have involved "hunting" or overadjustment in seeking the desired constancy of position relative to the earth's surface.

More specifically, therefore, it is an object of this invention to provide a vehicle-carried, power-actuated knife, suitable for cutting sugar cane, with means for continuously automatically maintaining its cutting level in a predetermined substantially constant relationship to and near or slightly below the earth's surface as it encounters minor variations therein.

It is a further object to provide such a means by which the desired adjustment will be rapid and positive, yet will be free of undesired "hunting."

Although this invention is primarily directed at this problem involved in sugar cane harvesting, similar problems are involved in other powered cutter operations to which this invention may be readily applicable as will be hereinafter shown by way of example and as will be readily apparent to those skilled in power cutting apparatus and methods for various purposes.

Other and further objects will be apparent when the specification herein is considered in connection with the drawings, in which:

FIG. 1 is a view showing a prefererd embodiment of the invention, partially in elevation and partially diagrammatic.

FIG. 2 is a fragmentary plan view of that portion of the device shown in elevation in FIG. 1.

FIG. 3 is a right side elevation of the cutter blade, pantograph mount therefor, and adjustment cylinder shown in FIG. 2.

FIG. 6 is a view similar to FIG. 3, showing a modification.

FIG. 7 is a front elevational view partially diagrammatic, of still another embodiment of the invention, in which the cutter blade is revolved in a vertical plane, as it would be, for example, in a ditching machine or the like.

FIG. 8 is a side elevational view of the cutter blade shown in FIG. 7.

FIG. 9 is a side elevational view of a heavier type of harvester, tractor propelled, with blade adjustment means according to this invention indicated at least partially diagrammatically.

FIG. 10 is a plan view of the harvester shown in FIG 9.

FIG. 11 is a side elevational view of another heavier type of harvester, tractor propelled.

FIG. 12 is a plan view of the harvester shown in FIG. 11, and

FIG. 13 is a diagrammatical view of adjustment elements common to the adjustment of the cutting blades indicated in FIGS. 9–12, inclusive.

Figure 4:
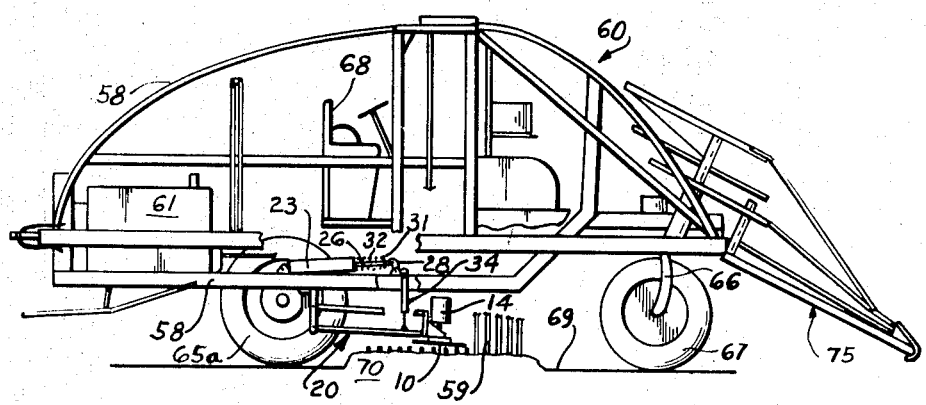
FIG. 4 is a right side elevation of a sugar cane harvester equipped with a revolved cutter blade and adjustment means therefore, as shown in FIGS. 1–3.

In the embodiments disclosed herein the objects of the invention are achieved by employing a power transmitting means for driving the blade, with means connected with the power transmitting means for sensing the resistance to the operation of the blade, a retractible support for adjustably supporting the blade in various positions relative to a carrier, which in a general sense positions the blade relative to the work, and adjusting means connected both to the support for adjusting the same, and to the sensing means, to raise the support whenever the resistance to the operation of the blade exceeds a predetermined value and lower it whenever the resistance falls below such value. The adjusting means has a spring type bias constantly biasing it toward a lowering adjustment and a power means controlled by the sensing means constantly urging the adjusting means toward a higher adjustment, with a force varying with resistance to the operation of the blade. The spring and power means will be so adjusted as to be exactly in balance when the resistance to operation of the blade is what it should be with the blade cutting at its predetermined rate into cane butts and near or just below the earth's surface. The support will maintain the blade at the height it then occupies. Then if the blade encounters more resistance, as in the case of the cane cutting blade if it should encounter a slight rise in the earth's surface and hence dig into or deeper into the earth, the power means will exert a greater force tending to raise adjustment of the blade. This force will distort the spring type bias until it exerts an increased force again balancing the force of the power means. However, as the blade is raised under the increased force exerted by the power means, the resistance to operation of the blade will decrease and the force exerted by the power means will decrease simultaneously. Thus, after an initial rise, the power means force tending to raise the blade will decrease as the blade rises while the opposing force, exerted by the spring type bias, will increase until the two again are in balance and again will maintain the desired position of the blade as long as the resistance to its operation remains constant. The increasing force of the spring type bias will prevent overtravel of the adjustment when resistance to operation increases suddenly and will thus prevent "hunting." The spring type bias in the new position will exert a greater force than when the blade was lower. This will result in the blade position being slightly lower relative to the surface when in a high position of adjustment relative to the carrier than when in a low position of adjustment. However, the spring type bias is so chosen that this change is within the expected range of adjustment in operation, and will be so small as to produce no more than a tolerable variation in the position of operation of a blade relative to the surface of the earth or the like when in its highest position of adjustment as compared with its lowest position. It is to be understood that while a coil spring is shown as the spring type bias in the various forms shown in the drawing, the term is not intended to be limited to a spring. Rather, any device which will provide a bias that increases with retractive movement and decreases with the opposite movement of the blade is intended to be included in the term "spring type bias."

Referring now in detail to the drawings in which like reference numerals are applied to like elements in the various views, a rotating cutter blade 10 adapted for use as part of a sugar cane harvester is shown in FIGS. 1–3, which is coupled by a coupling 11 to the shaft 12 of a blade driving constant volume hydraulic motor 14. The motor 14 is mounted on an angle bracket 15 which is in turn mounted on the vertical cross-member or bracket 16 which ties together the upper and lower right arms 17a, 17b and the upper and lower left arms 18a, 18b of a pantograph 20, forming a retractable and extensible support for the cutter blade. The left and right sides of the bracket 16 are in turn tied together by cross-pin means 38. The rear ends of the right arms 17a, 17b are connected by bolts 19 to a right upright member 21a which extends downwardly from a frame member 22a; the left arms 18a, 18b being correspondingly connected by bolts 19 to a left upright member 21b which extends downwardly from a frame member 22b.

Also, there is, in accordance with this invention, a means movable to adjust the cutter support. To provide this movement a power means is provided in the form of a single-acting hydraulic cylinder 23, having its rear or closed end pivotally connected to a bracket 24. Such bracket 24 is shown mounted on a cross-member 25 indicated in FIG. 2 as extending between the frame members 22a, 22b, these cross and frame members constituting part of the vehicle or carrier which in this case is a cane harvester. The piston rod 26, at the opposite end of a cylinder 23 from the bracket 24, is pivotally connected to the upper arm 27 of a bellcrank lever 28, the bellcrank lever being pivotally mounted upon a bracket 29, which is in turn mounted centrally of a cross-member 30 indicated in FIG. 2 as extending across between the frame members 22a, 22b of the carrier. A flange 31 is rigidly connected to the piston rod 26 and furnishes a forward bearing base for the forward end of a spring type biasing means, shown here in the form of a spring 32 which extends rearwardly around the piston rod 26 so that its rear end bears against the forward end of hydraulic cylinder 23.

A hydraulic cylinder 34 is shown with upper or closed end pivotally connected to the lower arm 33 of the bellcrank lever 28 while the piston rod 49 of such cylinder 34 is pivotally connected at its lower end to a bracket 36 which in FIGS. 2 and 3 is shown mounted on a cross plate 37 extending between the opposed lower pantograph arms 17b, 18b. Thus the bellcrank 28 and the link provided by cylinder 34 and rod 49 provide a means which interconnects the parts of the carrier and support combination which are relatively movable on retraction and extension of the support and are variable to adjust the position of the support. The cylinder 34 and rod 49 when locked together, as hereinafter described, provide a fixed link in such connecting means, but provide a limiting means for limiting downward movement of the cutter and upon extension or retraction of such cylinder and rod, will adjust such limit.

FIG. 1 shows a tank or reservoir 50 from which a pump, here shown as a constant volume pump 41 takes suction and delivers fluid through a conduit 43 to a two-position, four-way, directional control valve 44, and thence through a conduit 43a to a T 45. From the leg of the T 45 fluid passes through a conduit 43b.

A flexible conduit 43c continues from the conduit 43b and makes connection to deliver drive fluid into the fluid motor 14. Thus conduits 43, 43a, 43b and 43c and valve 44 constitute a means for transmitting driving power to the blade 10. From the fluid motor 14 the returned fluid passes through a flexible discharge conduit 46c to a conduit 46b which extends to the directional control valve 44 and then by way of a conduit 46a, back to the reservoir 50. Also from the T 45 a conduit 47 extends forwardly and has connected thereto a flexible conduit 48 which delivers fluid into the forward end of the cylinder 23 to urge against the piston 40 from which forwardly extends the aforesaid piston rod 26. The connection of conduit 47 to the T 45 serves as a sensor of the pressure of fluid in the fluid line for transmitting driving power to the blade and hence of the resistance to its operation. This pressure in turn is applied to the piston 40 causing it to produce a force opposing the spring 32 which force is proportional to the resistance to operation of the blade 10.

The pump 41 is of a type which increases fluid pressure in the delivery conduit 43a, 43b, 43c in the event flow through said conduits encounters increased resistance, as when the blade 10 encounters increased resistance. An example of such a condition could be that of the blade 10 encountering increased resistance in cutting sugar cane at a lower level than that elevation at which it has been calibrated to cut.

Now, since the rows of cane have longitudinal undulations therein, as well as other variations in configuration, the blade may cut into a row at a lower elevation than the reference elevation of calibration, or deeper into the row than "just where the cane butts grow out of the ground." As this occurs the blade not only has to overcome the resistance of the cane butts with any uppermost ground roots, but also it has to overcome the resistance encountered by striking into the soil of the row. Thus a greater torque load is placed upon the blade 10.

Obviously there must result an increase in pressure of the fluid delivered to the motor 14 by way of the flexible conduit 43c, and this increase in pressure through the sensing connection provided by the T 45 also results in the fluid in the conduit 47 and flexible conduit 48 increasing the pressure against the piston 40 in the cylinder 23.

An increase of pressure causes the piston 40 to be urged to the left or rearwardly and thus the spring 32 is compressed and the bellcrank lever long arm 27 is pivoted to the left or rearwardly. As a consequence an upward lift is exerted upon the cyclinder 34 serving as a fixed length linkage thus to raise the forward end of the pantograph 20 which is connected to the lower end or immobilized piston rod 49 of the cylinder 34, thus increasingly to raise the cutter blade 10. As the cutter blade 10 is raised, it will cut at a higher level relative to the earth's surface where it will still cut the stalks of cane but will encounter less and less resistance by virtue of cutting into the row soil. Correspondingly the hydraulic pressure of the system will decrease as the blade rises to that as the blade rises the pressure on the piston causing it to rise decreases while the force of the spring 32 opposing the rise increases until the two balance and stabilize the position of the blade. Since the spring bias against rising increases as the rise occurs while the hydraulic pressure causing the rise decreases, overtravel of the blade upwardly will be prevented. Conversely if the resistance to blade operation suddenly decreases due to a lower level of earth therebeneath, pressure tending to hold the blade up will decrease and the blade will start down under bias of the spring but as the blade moves downwardly the spring expands and the force it exerts decreases while as the blade encounters increased resistance on digging deeper into the earth the pressure on the piston 40 opposing downward movement will increase until the two balance and stabilize the blade level. Again, the force opposing the movement increases while that causing it decreases, preventing overtravel and "hunting."

Thus the piston 40 may move to the right or forwardly and the spring 32 can expand against less opposition, the distance between the flange 31 and the forward end of the cylinder thus increasing as the piston rod 26 moves forwardly.

The hydraulic cylinder 34 and its piston rod 49 normally serve simply as a connection member or linkage between the pantograph 20 and the bellcrank lever arm 33, but also this cylinder 34 and immobilized piston rod 49 may serve an additional purpose as will hereinbelow described.

A second fluid pump 51 is shown in FIG. 1 taking suction from the reservoir 50 and discharging through a conduit 52 to a three-position, four-way valve 55, shown diagrammatically in FIG. 1. From the valve 55 a return conduit 54 can direct fluid back to the reservoir 50. Also from this valve 55 opposed conduits 56 and 57 extend respectively to connect into the lower and upper ends of the double acting cylinder 34. In the position shown in the drawings, the valve 55 communicates with no conduits and the fluid on opposed sides of the piston, not shown, is locked in fixed position within the cylinder 34.

However, when the blade 10 is to be raised to a safe, inoperative position, as when the machine carrying the blade is in transit, the blade 10 may be lifted by turning the directional control valve 55 shown in FIG. 1, for approximately 45 degrees in a counterclockwise direction. Thus the fluid delivered by the pump 51, and passed through the conduit 52 to the valve 55, will pass through the conduit 56 into the lower end of the cylinder 34, and below the head of its piston, not shown, thus to lift the piston rod 49 to move the pantograph 20 substantially upwardly, whereby the cutter blade 10 is correspondingly lifted. The fluid displaced upwardly, as the pantograph 20 is lifted, is returned through the conduit 57 and control valve 55, by way of the conduit 54, to the reservoir 50. The valve 55 may then be turned 45 degrees to lock the piston of the cylinder 34 in an upper position, thus to lock the cutter blade 10 in raised position. The bell crank 28, by connection to the piston rod 26, or otherwise, will have a limit of rotation to the right in FIG. 1, and hence, any given locked position of the cylinder 34 and rod 49 will serve, with such limit on bell crank rotation, to limit downward movement of the blade.

Figure 5:
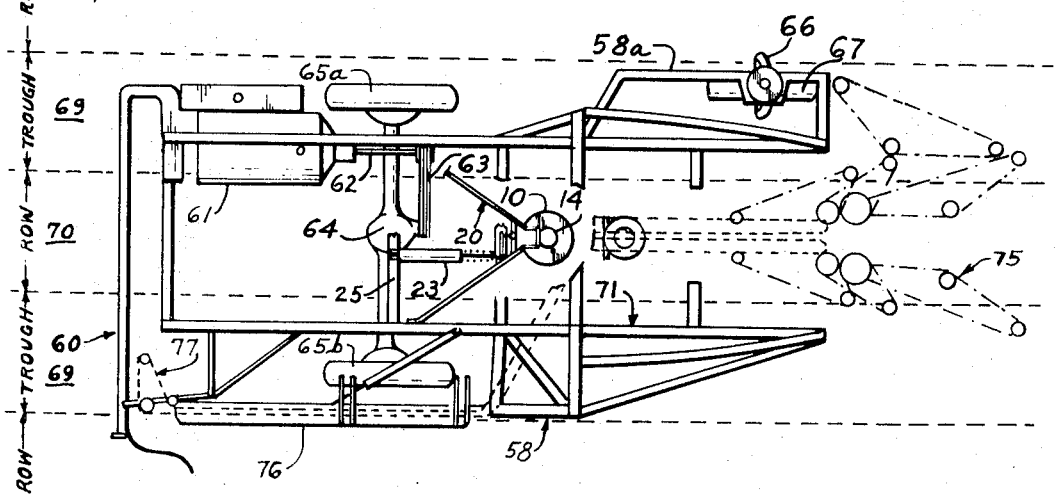
FIG. 5 is a plan view of the sugar cane harvester shown in FIG. 4, parts being shown in dotted lines and parts broken away for the purpose of permitting better illustration of the position and operation of this invention therein.

As shown in FIGS. 4 and 5, the cutter blade 10, carried by the pantograph 20 supported below the frame 58 of a sugar cane harvester 60, is indicated to be cutting sugar cane stalks 59.

The harvester 60 is shown as carrying a gasoline engine 61 with shaft 62 connected by chains 63 to drive the harvester differential 64. Conventionally the differential 64 drives the harvester rear wheels 65a (left) 65b (right), while the frame 58 carries a swivelled yoke 66 which provides the journals for the axle of a left forward wheel 67. Thus an operator, not shown, may sit in the driver's seat 68, and drive the harvester.

In this regard the driver steers the harvester 60, holding it with left front wheel 67 and left rear wheel 65a tracked in that trough 69 between rows which is immediately to the left of a row 70 from which grows the sugar cane being harvested, as indicated by the sugar cane 59 in FIG. 4. For reasons of expediency the left front wheel 67 is supported by a leftward extension 58a of the frame 58 whereby an arched frame or truss 71 may be provided to extend co-axially of the harvester 60. Thus the gathering device 75, best indicated diagrammatically in dotted lines in FIG. 5, and in side elevation full lines in FIG. 4, can be carried and supported from the truss or arch frame 71 in manner that the machine can more accurately straddle a row 70 from which grow the cane stalks 59 to be cut.

The can is directed into the track 75 as the harvester 60 advances forwardly or to the right in FIGS. 4 and 5. After the cane is cut off and topped the stalks of cane are carried in a chain conveyor rearwardly to pass to the right along trackage within the harvester piler arm 76 to be dropped at the right rear across adjacent cane rows by rear guide and deposit trackage 77. This type of machine can be considered as conventional, in general principles, or as an improved type of harvester, but in either case the disclosure herein is set forth for purposes of showing one very practical usage of the continuously automatically adjustable support combination for the cutter blade 10 which comprises the gist of this invention.

As set forth hereinabove, it is in this type of usage that, when the cutter blade cuts too low, the torque thereat will be increased, since he blade 10 then has to cut the butts of the cane stalks as well as into the soil of the row 70. Thus the hereinabove described adjustment will of necessity be brought into play in a very practical manner to achieve the purposes of the invention herein.

In FIG. 6 is shown a modification which is similar to that shown in FIG. 3 except for the placement and operation of the cylinder 34a which replaces the cylinder 34 of FIG. 3. In FIG. 6 the cylinder 34a is anchored on a vehicle frame member 22a or other suitable fixed frame member, and its rod 49b has connected to its lower end a flexible connecting member 49c whose opposite end is connected to the pantograph 20. It is apparent that the relative positions of the cylinder 34a and the rod 49b can be regulated by fluid from a source and through a valve as shown in FIG. 1 for cylinder 34, through conduits 56a and 57a. The relative positions in which such cylinder 34a and rod 49b are maintained, will act through the flexible connector 49c to provide a downward limit of movement for the blade, while permitting its adjustment above such limit by the automatic adjustment of the pantograph as previously described. In this form, the connecting rod 49a replaces the cylinder 34 and rod 49 of FIG. 3 as a link of the pantograph adjustment. It may be made adjustable in length, if desired, by any suitable adjusting means.

The invention also has application in cases where the cutter blade may be employed to operate in a vertical plane rather than in a horizontal plane. Thus, as shown in FIGS. 7 and 8, a cutter blade 10b is mounted to dig a trench or a ditch 107, the drive motor 108 for the blade 10b being supported by a bracket 109 of a pantograph 20b. In this case the motor 108 is indicated as being a hydraulic motor supplied by a delivery conduit 110a with the fluid being returned through a conduit 110b.

Referring now to FIGS. 9 and 10, a large type harvester 115 is shown with body or frame 116 shown divided into two sections 116a, 116b, an arm 117a outwardly of the right section 116a extending rearwardly to the right side of a prime mover or propelling tractor 119. The arm 117a pivots on an axle 118 which extends transversely outwardly from the body of the tractor 119 and through the right caterpillar track 120 to the rear of the right forward traction wheel 121 of the tactor. Correspondingly the am 117b pivots on an axle 118 (co-axially extensive with the aforesaid axle 118 on the right side) which thus extends transversely outwardly from the tractor body or frame 119, and through the left caterpillar track 120 to the rear of the left forward tractor traction wheel 121.

Each harvester section 116a, 116b supports a rotating cutter blade 122 which is driven by a motor such as a constant volume hydraulic fluid motor 125, also supported by the respective section. A pair of strong springs 126, with upper ends connected to the forward end of the tractor 119 and with lower ends connected forwardly to a respective section, thus keeps the harvester sections in suspension above the cane rows 150. A hydraulic cylinder system 130 is mounted to the side of the respective sections, that is on the right side of section 116a and on the left side of section 116b.

Each cylinder system 130 includes a hydraulic cylinder 127 mounted on the side of the harvester section, with an inlet 128 thereinto at the forward end of the cylinder, thus to admit fluid behind the piston therein, not shown, to urge the piston, and its rod 129 with it, to the rear. The piston rod 129 extends forwardly of the piston 127 and at a spaced distance from the piston it has a flange 131 connected to the rod 129 to provide a forward bearing surface for a spring 132 which extends around the rod 129 and bears rearwardly against the forward end of the cylinder 127.

Forwardly of the flange 131 the piston rod 129 has a cross-pin 137 thereacross, the cross-pin 137 being engageable in a slot 136 in the short arm 133 of a bellcrank lever 135 pivoted on a pin 138 which extends transversely from the side of the harvester section. The long arm 134 of the bellcrank lever 135 connects pivotally by a pin 139 across a yoke 141 which supports the axle 142 of a lift or leverage wheel 143. A bracket 144, shown in cross section in FIG. 9, guidably, slidably receives the yoke 141 therethrough.

The blade 122 for each harvester section may be driven from a separate constant volume, hydraulic pump 41, as shown in FIG. 13, the pump drawing fluid from a reservoir 50 and discharging by way of a conduit 43 to a two-position, four-way valve 44, and then passes by way of a conduit 43a to a T 45 where the drive pressure fluid passes through the leg of the T, by way of a conduit 43b to the flexible conduit 123 into a respective motor 125, as shown in FIGS. 9–12.

From each drive motor 125 the fluid is returned by way of the flexible conduit 124, shown in FIGS. 9–12 and in FIG. 13, by way of the conduit 46b, and through the valve 44, and return conduit 46a, to the reservoir 50.

In the form of the invention shown in FIGS. 9 and 10 the tractor 119 with its tracks and wheels 143 form a carrier corresponding to the harvester vehicle of FIGS. 4 and 5. The harvester 115, pivoted to the tractor 119 at 118 and resting partly on wheels 143 forms a retractable and extensible support for the blades 122 for movement of the blades toward and away from the ground on which they work, and the conduits 43, 43a, 43b and 123 constitute means for transmitting power to drive the blades. The bellcranks 135 and yokes 141 interconnect the gauge wheels 143 of the carrier and the harvester 115 providing the support and are movable to adjust the position of the support relative to the carrier as well as to the ground. The T's 45 provide the sensors, as in FIGS. 1–5 for sensing variations in blade driving power, and the cylinder system 130 is a power means connected to the T's 45 and the bellcranks 135 for urging the bellcrank toward retraction of the harvester 115 and blade 122 from lower to higher positions. Finally the springs 132 bias in opposition to the cylinder system 130.

If, due to longitudinal undulations in the row 151, or because of other variation of row configuration from the designed pattern, the cutter blade 122 cuts relatively below the level "just where the cane butts grow out of the ground," then there occurs an increase of pressure in the conduit 43b, 123, to supply the additional torque to cut deeper into the row soil. Correspondingly an increase of pressure in the conduit 47, 128 moves the piston, not shown, within the cylinder 127 to the left. This further compresses the spring 132 so that the spring pressure is increased. As further compression of the spring 132 is caused by piston rod movement to the left, compression of the spring 132 results as the pin 136 on the piston rod 129 draws the upper end of the bellcrank lever short arm 133 to the left.

As the lever 135 pivots about the pivot pin 138, the long arm 134 thereof urges the upper end of the yoke 141 downwardly with relation to the guide bracket 144, with the consequence that the wheel 143 becomes a lift fulcrum and the front end of the harvester section is raised. Consequently the cutter blade 122 is lifted with relation to the row 151 and the adjustment finds the elevation "just where the cane butts grows out of the ground" when fluid pressure against the piston of the cylinder 127 is opposed by a balancing spring pressure.

An alternate arrangement for adjustment is shown in FIGS. 11 and 12, where the piston systems 130 are mounted on the right side and left side, respectively, of the prime mover or propelling tractor 119. In this case the forward bearing flange 131a, against which bears the forward end of the spring 132, has a clevis 131b, as the forward part thereof, and a cable 142, tied rearwardly into the clevis 131b, is connected forwardly to a ring 142a in a respective harvester section.

The pull of the spring 126 is determined, before the cable is connected, to be that pull which is ample to dispose a harvester section 116a or 116b to support its respective cutter blade 122 to cut "just where the butts grow out of the ground" while the fluid pressure exerted against the piston in the cylinder 127 is that resulting from the power necessary to operate the blade when it is at such proper height. Then, if the blade 122 cuts too low, and into the soil of a row 151, as the caterpillar 120 traverses a trough 150, an increased fluid pressure must act to supply the torque to enable the motor to drive the blade to cut deeper into the row 151. The same pressure will act in the cylinder 127, and the spring 132 is thus compressed, as the piston rod 129 is moved to the left, to achieve a counterbalancing spring pressure, thus lifting the blade 122 toward cutting at the reference conditions where a torque responsive to the predetermined optimum fluid pressures is adequate to resolve the blade 122 to cut "just where the cane butts grow out of the ground."

In FIGS. 11 and 12, the parts function much the same as in FIGS. 8 and 9. However, the tractor 119 provides the entire carrier, the means interconnecting parts of the tractor 119 and support 115 and movable to adjust the support are the cables 142 and the piston rods 129, the power means are the piston and cylinder combinations 127, and the spring type bias means are the springs 132. Gauge wheels 143 are omitted.

In the form of invention shown in FIGS. 9 and 10, if the blade 122 should cut too high, so that it requires less power than required to supply the torque to cut into the cane butts just at the intended level adjacent the ground surface, then the piston, not shown, within the cylinder 127, can move on the right. Thus the piston rod 129 moves to the right and pivots the small bellcrank lever arm 133 clockwise, thus to pivot the long arm 134 upwardly to lift the leverage wheel 143, whereby the front end of the harvester section may lower to dispose the blade 122 at position where it requires for operation a torque that cuts the cane butts just at the intended level relative to the ground surface.

Also, in the form of invention shown in FIGS. 11 and 12, if the blade 122 should cut too high then the reduced pressure in the cylinder 127 lets the piston, not shown, move to the right. Thus the piston rod 129 has to move, with the piston, to the right and the spring 132 expands. The cable 142 may thus move with the clevis 131b to the right to let the front end of the harvester section descend and keep the cable taut, the spring 126 stretching accordingly. This should result in disposing the cutter blade 122 as position where it requires for operation a torque that cuts the cane butts just where they grow out of the ground.

It should be noted that some other suitable type of connection may be employed between the outer or right end of the piston rod 26, and the right end of the pantograph 20, and can serve in function to the same purpose as to adjusting cutter blade elevation as the bellcrank lever 28 and fixed effective length cylinder 34 and piston rod 49, as shown in FIGS. 1 and 3.

Also, in the forms of invention shown in FIGS. 1–5, inclusvie, it may not be necessary to employ a pantograph to acheive the desired movement and relative motions, but rather an element corresponding with a simple yoke member, with opposed rear ends pivotally connected to the harvester frame, may serve as well.

We claim:

1. In a support combination for a power operated cutter which comprises: a carrier for generally supporting the cutter adjacent its work, a retractable and extensible support having relatively movable parts connected to said carrier and adapted for connection to said cutter for movement toward and away from its work between positions retracted to the greatest desirable degree from the work and taking the deepest contemplated cut into the work, respectively, and means for transmitting power to the cutter to drive the same; the improvement which comprises: means interconnecting parts of said carrier and support combination which are relatively movable on retraction and extension of said support and variable to adjust the position of said support, a sensor connected to said power transmitting means for sensing variations in power transmitted to said cutter indicative of changes in resistance to operation of said cutter, power means connected to said sensor and said interconnecting means for urging said interconnecting means toward retracting adjustment of said support with a variable force proportional to resistance to operation of said cutter, and spring-type biasing means connected between parts of the combination which parts of the combination are movable relative to one another on and in proportion to retraction and extension of said support in opposition to the action of said power means so as to provide an increasing force opposing said power means as said support is retracted and vice versa.

2. The improvement in a support combination for a power operated cutter as set forth in claim 1 in which the means interconnecting parts of said carrier and support combination include limit means variable to adjust the limit of extension of said support.

3. The improvement in a support combination for a power operated cutter as set forth in claim 2 in which said limit means is a variable length link in said interconnecting means, and means for fixing the length of said link at any desired length within its variable range.

4. The improvement in a support combination for a power operated cutter as set forth in claim 3 in which said link is a double acting hydraulic cylinder, and means for fixing its length is a valve means for closing both ends of the cylinder while it is filled with hydraulic fluid.

5. The improvement in a support combination for a power operated cutter as set forth in claim 1 in which said spring type biasing means comprises a resilient body having one dimension shortenable under compression and positioned to be compressed to shorten said dimension upon retraction movement of said support.

6. The improvement in a support combination for a power operated cutter as set forth in claim 1 in which said spring type biasing means is a compression type coil spring.

7. The improvement in a support combination for a power operated cutter as set forth in claim 1 in which said power transmitting means is a fluid pressure conduit, said sensor is a connection to said conduit to receive fluid pressure therefrom proportional to the pressure existing in said conduit, and said power means is a fluid pressure actuated means subjected to the fluid pressure from said sensor and of a character to exert an output force proportional to the fluid pressure to which it is subjected.

8. The improvement in a support combination for a power operated cutter as set forth in claim 7 in which the fluid pressure conduit, sensor and power means are hydraulic pressure means.

9. The improvement in a support combination for a power operated cutter as set forth in claim 8 in which there is a constant volume hydraulic pump supplying hydraulic power to said conduit and a constant volume hydraulic motor on said support for driving said cutter.

10. The improvement in a support combination for a power operated cutter as set forth in claim 7 in which the fluid pressure power means is a piston and cylinder combination.

11. The improvement in a support combination for a power operated cutter as set forth in claim 10 in which the spring type biasing means is connected between parts movable with said piston and cylinder respectively.

References Cited

UNITED STATES PATENTS

| | | | |
|---|---|---|---|
| 885,834 | 4/1908 | Briggs | 74—33 |
| 2,212,751 | 8/1940 | Powers et al. | 56—121.46 |
| 2,788,629 | 4/1957 | Becker | 56—157 |
| 2,804,751 | 9/1957 | Schroeder | 173—8 |
| 2,846,094 | 8/1958 | Pilch | 37—103UX |
| 2,969,601 | 1/1961 | McMaster | 37—94 |
| 3,002,330 | 10/1961 | Thomson | 56—17 |
| 3,090,185 | 5/1963 | Thomson | 56—17 |
| 3,091,874 | 6/1963 | Wuigk | 37—190 |
| 3,223,180 | 12/1965 | Akin et al. | 173—7 |
| 3,233,680 | 2/1966 | Arzoian et al. | 172—4 |
| 2,748,552 | 6/1956 | Pool et al. | 56—15 |

ROBERT E. PULFREY, Primary Examiner

C. D. CROWDER, Assistant Examiner

U.S. Cl. X.R.

56—503; 37—94, 189; 299—1, 41; 173—8; 172—4; 91—4.12